United States Patent [19]

Kitami et al.

[11] Patent Number: 4,862,923
[45] Date of Patent: Sep. 5, 1989

[54] AIR CONDITIONING HOSE

[75] Inventors: Tetsu Kitami, Hadano; Jun Mito, Kanagawa, both of Japan

[73] Assignee: The Yokohama Rubber Co., Ltd., Tokyo, Japan

[21] Appl. No.: 869,310

[22] Filed: Jun. 2, 1986

[30] Foreign Application Priority Data

Jun. 5, 1985 [JP] Japan .................................. 60-83924

[51] Int. Cl.⁴ ............................................. F16L 11/12
[52] U.S. Cl. .................................... 138/125; 138/126; 138/137; 138/174
[58] Field of Search ......................... 62/243, 244, 498; 138/109, 125, 126, 127, 128, 137, 140, 153, DIG. 7; 156/149; 428/36

[56] References Cited

U.S. PATENT DOCUMENTS

| | | | |
|---|---|---|---|
| 2,564,602 | 8/1951 | Hurst | 138/125 |
| 2,800,145 | 7/1957 | Peierls et al. | 138/137 X |
| 2,899,982 | 8/1959 | Harpfer | 138/126 X |
| 3,528,260 | 9/1970 | Binder | 138/126 X |
| 3,805,848 | 4/1974 | Chrow | 138/137 |
| 3,828,112 | 8/1974 | Johansen et al. | 138/126 X |
| 4,111,237 | 9/1978 | Mutzner et al. | 138/126 X |
| 4,343,333 | 8/1982 | Keister | 138/126 X |
| 4,431,031 | 2/1984 | Ettlinger | 138/126 X |
| 4,510,974 | 4/1985 | Natori et al. | 138/127 X |

Primary Examiner—William A. Cuchlinski, Jr.
Attorney, Agent, or Firm—Finnegan, Henderson, Farabow, Garrett & Dunner

[57] ABSTRACT

A hose for auomotive air-conditioning, transporting or otherwise handling refrigerants is disclosed which comprises an inner and an outer cover and a reinforcement disposed therebetween, the inner tube including an inner and an outer peripheral wall and a polyamide layer laminated therebetween. The inner and outer peripheral walls have a specified range of elasticity, and the polyamide layer has a specified thickness, whereby the hose is rendered highly resistant to heat, moisture-permeation and refrigerant-permeable, and flexible, and further free of damage from creeps or cracks from dynamic fatigue in the vicinity of metal fitting applied on the hose.

5 Claims, 1 Drawing Sheet

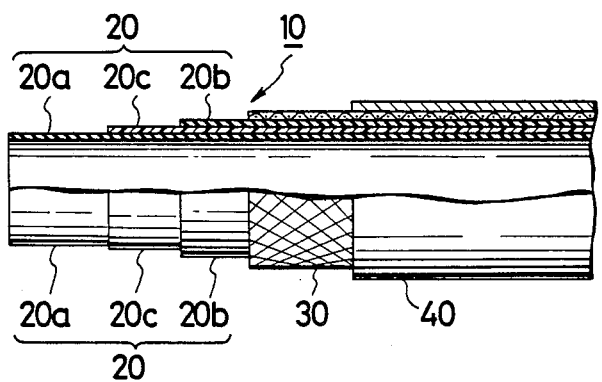

AIR CONDITIONING HOSE

BACKGROUND OF THE INVENTION

1. Field of the Invention:

This invention relates to improvements in and relating to hoses for automotive air-conditioning, transporting or otherwise handling refrigerants.

2. Prior Art:

Hoses of this description find wide application for instance in automotive air-conditioning systems.

The trend of higher environmental temperatures at which they are used has compelled the manufacturers to produce high-quality hoses capable of meeting in particular with the following requirements:

1. Good heat resistance, proofness to liquid permeation (refrigerants and moisture), and high flexibility.
2. Freedom of damage to tube from creeps which would otherwise develop when clamping metal fittings on the hose, (i.e. good sealing effect).
3. Freedom of cracks which would otherwise result during use of the hose from dynamic fatigue in the vicinity of metal fittings, (i.e. good sealing effect).

Prior art hoses are known in variety but none has been found satisfactory in respect of the above quality requirements.

SUMMARY OF THE INVENTION

It is the primary object of the present invention to provide a hose for air-conditioning systems which incorporates structural features to enable compliance with the foregoing requirements.

According to the invention, a hose comprises an inner tube, a reinforcement and an outer cover, the inner tube including an inner wall and an outer wall both having an elasticity by 100% modulus of 30–120 kgf/cm$^2$, and a polyamide resin layer laminated between the inner and outer walls and having a thickness of 0.1–1.0 mm.

The above objects and other features of the invention will be better understood from the following description taken in connection with the accompanying drawing which illustrates by way of example a preferred embodiment of the invention.

BRIEF DESCRIPTION OF THE DRAWING

The drawing is a segmentary, partly cut away, view of a hose embodying the invention.

DETAILED DESCRIPTION OF THE PREFERRED EMBODIMENT

Refering to the drawing, there is shown a hose 10 provided in accordance with the invention which is suitable for use in automotive air-conditioning, transporting or otherwise handling refrigerants. The hose 10 is a multi-layered structure which comprises an inner tube 20 including an inner peripheral wall 20a, an outer peripheral wall 20b and a polyamide resin layer 20c laminated therebetween; a reinforcement 30 laminated over the outer wall 20b; and an outer cover 40 laminated over the reinforcement 30.

According to an important aspect of the invention, the inner and outer walls 20a and 20b of the inner tube 20 are formed by a class of materials which excel in moisture resistance, anti-fatigue, vibration absorption and heat resistance and which in addition have an elasticity by 100% modulus of 30–120 kgf/cm$^2$. Eligible examples of such materials include chlorosulfonated polyethylene, chlorinated polyethylene, ethylene-propylene rubber, isoprene-isobutylene rubber, chlorinated or brominated butyl rubber, and nitril-butadiene rubber. It has been found that elasticities of these materials if less than 30 kgf/cm$^2$ by 100% modulus would make it difficult to mount the metal fittings securely on the hose, and greater elasticities than 120 kgf/cm$^2$ would result in reduced fluid-tightness around the metal fittings.

The inner and outer wall 20a and 20b both have a thickness preferably in the range of 0.2–4.5 mm. Smaller thicknesses than 0.2 mm would make the hose less resistant to moisture permeation, and larger thicknesses than 4.5 mm would literally make the hose objectionably fat.

The polyamide resin layer 20c of the inner tube 20 is formed by a material which is highly resistant to refrigerants, to fatigue and to heat. Specific examples of such a material include 6-nylon, 66-nylon, 6/66-nylon and 11-nylon (preferably non-plastic type). Importantly, the layer 20c should be 0.1–1.0 mm thick. Smaller thicknesses than 0.1 mm would lead to reduced resistance to refrigerant permeation and to fatigue, and larger thicknesses than 1.0 mm would make the hose less flexible. It has now been found that the most preferred thickness of the polyamide layer 20c ranges between 0.2 mm and 0.5 mm.

The thickness of the inner tube 20 as a whole is thus preferably in the range of 1–5 mm.

The reinforcement 30 is knitted from textile yarns of polyester, nylon, rayon or the like.

The outer tube 40 of the hose is formed by a class of rubber materials which excel in moisture resistance, weather-proofing, anti-fatigue, anti-friction and heat resistance. Its thickness is preferably in the range of 1–3 mm. Smaller thicknesses than 1 mm would make the hose vulnerable. Larger thicknesses than 3 mm would make the hose too fat.

Tests were made as per tabulated conditions in the following Table, wherein there were used test samples conforming with the specifications of nominal 11 14 $\phi$ automotive discharge (high-pressure) air-conditioning hoses and having reinforcing layers 30 and outer tubes 40 of the same size and material.

Although various minor modifications may be suggested by those versed in the art, it should be understood that we wish to embody within the scope of the patent warranted hereon, all such embodiments as reasonably and properly come within the scope of our contribution to the art.

TABLE

| sample | polyamide resin | thickness (mm) of inner tube | | | 100% modulus (kgf/cm) of inner and outer walls | *(1) seal at metal fittings | *(2) dynamic cracks in polymide layer (cycle) | flexibility |
| --- | --- | --- | --- | --- | --- | --- | --- | --- |
| | | inner wall | polyamide layer | outer wall | | | | |
| 1 | 11 nylon | none | 0.5 | 1.5 | 25 | bad | 40,000 | good |
| 2 | " | none | 0.5 | 1.5 | 85 | good | 170,000 | good |

TABLE-continued

| sample | polyamide resin | thickness (mm) of inner tube | | | 100% modulus (kgf/cm) of inner and outer walls | *(1) seal at metal fittings | *(2) dynamic cracks in polymide layer (cycle) | flexi- bility |
| --- | --- | --- | --- | --- | --- | --- | --- | --- |
| | | inner wall | polyamide layer | outer wall | | | | |
| 3 | " | 0.2 | 0.5 | 1.3 | 85 | good | 300,000 | good |
| 4 | " | 1.0 | 0.5 | 0.5 | 85 | good | " | good |
| 5 | " | 1.0 | 0.5 | 0.5 | 140 | bad | " | bad |
| 6 | 6 nylon | none | 0.5 | 0.5 | 85 | good | 260,000 | good |
| 7 | " | 0.2 | 0.2 | 1.6 | 85 | bad | 300,000 | good |
| 8 | " | 0.2 | 0.2 | 1.6 | 85 | good | 300,000 | good |
| 9 | " | 1.0 | 0.2 | 0.8 | 85 | good | " | good |

Note:
*(1) air pressure leak test at 40 kgf/cm² after a lapse of 168 hours at 135° C.
*(2) impulse test with pressure of 40 kgf/cm² × 100% SAE wave at 150° C. oil temperature and 120° C. ambient temperature.

What is claimed is:

1. A hose comprising an inner tube including an inner and an outer peripheral wall and a polyamide resin layer laminated therebetween, a reinforcement laminated over said outer peripheral wall, and an outer cover laminated over said reinforcement, said inner and outer peripheral walls having an elasticity by 100% modulus of 30–120 kgf/cm², and said polyamide resin layer being in continuous for and having a thickness in the range of 0.1–1.0 mm.

2. A hose according to claim 1 wherein said inner and outer peripheral walls are formed by a material selected from the group consisting of chlorosulfonated polyethylene, chlorinated polyethylene, ethylene-propylene rubber, isoprene-isobutylene rubber, chlorinated or brominated butyl rubber, and nitril-butadiene rubber.

3. A hose according to claim 1 wherein said polyamide resin layer is formed by a material selected from the group consisting of 6-nylon, 66-nylon, 6/66-nylon and 11-nylon.

4. A hose according to claim 1 wherein said reinforcement is knitted from textile yarns of polyester, nylon or rayon.

5. A hose according to claim 1 wherein each of said inner and outer peripheral walls has a thickness in the range of 0.2–4.5 mm.

* * * * *

REEXAMINATION CERTIFICATE (2174th)
United States Patent [19]
Kitami et al.

[11] B1 4,862,923

[45] Certificate Issued  Jan. 4, 1994

[54] AIR CONDITIONING HOSE

[75] Inventors: Tetsu Kitami, Hadano; Jun Mito, Kanagawa, both of Japan

[73] Assignee: The Yokohama Rubber Co., Ltd., Tokyo, Japan

Reexamination Request:
No. 90/002,360, Jun. 7, 1991

Reexamination Certificate for:
Patent No.: 4,862,923
Issued: Sep. 5, 1989
Appl. No.: 869,310
Filed: Jun. 2, 1986

[30] Foreign Application Priority Data

Jun. 5, 1985 [JP]  Japan ............... 60-83924

[51] Int. Cl.$^5$ ............................... F16L 11/12
[52] U.S. Cl. ................... 138/125; 138/126; 138/137; 138/174
[58] Field of Search ............. 138/124, 125, 126, 137, 138/172, 174, 140, 141

[56] References Cited

U.S. PATENT DOCUMENTS

| | | | |
|---|---|---|---|
| 4,110,396 | 8/1978 | Reynolds | 138/125 |
| 4,238,578 | 12/1980 | Rim et al. | |
| 4,249,971 | 2/1981 | Yap et al. | 138/126 |
| 4,288,576 | 9/1981 | Richwine | |
| 4,316,971 | 2/1982 | Rim et al. | |
| 4,431,031 | 2/1984 | Ettlinger | |
| 4,510,974 | 4/1985 | Natori et al. | |
| 4,633,912 | 1/1987 | Pilkington et al. | |
| 4,657,285 | 4/1987 | Akiyama et al. | 138/137 |

FOREIGN PATENT DOCUMENTS

58-144169  9/1983  Japan .

*Primary Examiner*—James E. Bryant, III

[57] ABSTRACT

A hose for auomotive air-conditining, transporting or otherwise handling refrigerants is disclosed which comprises an inner and an outer cover and a reinforcement disposed therebetween, the inner tube including an inner and an outer peripheral wall and a polyamide layer laminated therebetween. The inner and outer peripheral walls have a specified range of elasticity, and the polyamide layer has a specified thickness, whereby the hose is rendered highly resistant to heat, moisture-permeation and refrigerant-permeable, and flexible, and further free of damage from creeps or cracks from dynamic fatigue in the vicinity of metal fitting applied on the hose.

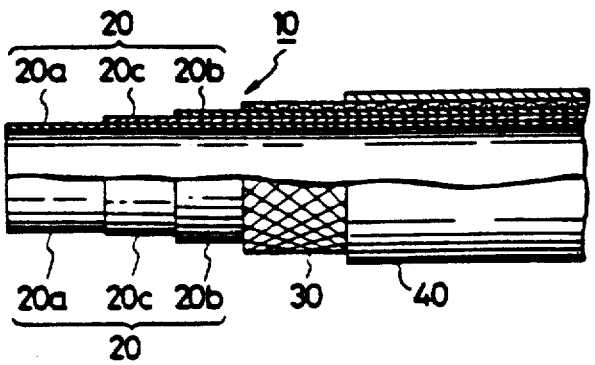

REEXAMINATION CERTIFICATE ISSUED UNDER 35 U.S.C. 307

THE PATENT IS HEREBY AMENDED AS INDICATED BELOW.

Matter enclosed in heavy brackets [] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 to 5 are cancelled.

New claim 6 is added and determined to be patentable.

6. *A hose having an inner tube including an inner and an outer peripheral wall and a polyamide resin layer laminated therebetween, a reinforcement laminated over said outer peripheral wall, and an outer cover laminated over said reinforcement, said inner and outer peripheral walls having an elasticity by 100% modulus of 30–120 kgf/cm², and said polyamide resin layer being in continuous form and having a thickness in the range of 0.1–1.0 mm,*

*wherein said inner and outer peripheral walls are formed by a material selected from the group consisting of chlorosulfonated polyethylene, chlorinated polyethylene, ethylene-propylene rubber, isoprene-isobutylene rubber, chlorinated or brominated butyl rubber, and nitril-butadiene rubber,*

*said polyamide resin layer is formed of 6-nylon, 66-nylon, 6/66-nylon or 11-nylon,*

*said reinforcement is knitted from textile yarns of polyester, nylon or rayon, and*

*each of said inner and outer peripheral walls has a thickness in the range of 0.2–4.5 mm.*

* * * * *